United States Patent [19]

Simon et al.

[11] Patent Number: 5,569,607

[45] Date of Patent: Oct. 29, 1996

[54] SLIDE FOR THE MICROSCOPIC EVALUATION OF LIQUID SPECIMENS

[75] Inventors: Thomas Simon, Bensheim; Ingo Kaiser, Mannheim; Carsten Carstensen, Heuchelheim, all of Germany

[73] Assignee: Boehringer Mannheim GmbH, Mannheim, Germany

[21] Appl. No.: 407,997

[22] Filed: Mar. 22, 1995

[30] Foreign Application Priority Data

Mar. 22, 1994 [DE] Germany ............ 44 09 786.7

[51] Int. Cl.⁶ .................. G01N 21/03; G02B 21/34
[52] U.S. Cl. .............. 436/46; 422/102; 359/396; 359/398; 356/244; 356/246; 156/73.1
[58] Field of Search .................. 359/396, 398; 436/46, 63; 422/102, 104; 356/244, 246; 156/73.1, 108, 292, 308.4

[56] References Cited

U.S. PATENT DOCUMENTS

| Re. 33,826 | 2/1992 | Mitchell | 359/398 |
|---|---|---|---|
| 1,474,812 | 11/1923 | Brooker | 356/246 |
| 1,480,391 | 1/1929 | Hausser | 356/246 |
| 1,630,146 | 5/1927 | Trenner | 356/246 |
| 1,836,915 | 12/1931 | George | 356/246 |
| 1,986,058 | 1/1935 | Hausser et al. | 359/398 |
| 1,994,483 | 3/1935 | Ott | 356/246 |
| 2,039,219 | 4/1936 | Hausser et al. | 88/40 |
| 2,182,467 | 12/1939 | Brown et al. | 356/246 |
| 2,235,310 | 3/1941 | Bausch | 356/246 |
| 2,300,252 | 10/1942 | Hall | 356/246 |
| 3,418,084 | 12/1968 | Allington | 422/70 |
| 3,705,000 | 12/1972 | Guerra | 356/246 |
| 3,777,283 | 12/1973 | Elkins | 331/94.5 |
| 3,961,346 | 6/1976 | White | 356/244 |
| 4,299,441 | 11/1981 | Parker | 350/95 |
| 4,501,496 | 2/1985 | Griffin | 356/246 |
| 4,587,213 | 5/1986 | Malecki | 435/39 |
| 4,607,921 | 8/1986 | Miller | 350/536 |
| 4,997,266 | 3/1991 | Mitchell | 350/535 |

FOREIGN PATENT DOCUMENTS

| 0210071 | 1/1987 | European Pat. Off. . |
|---|---|---|
| 2721345 | 11/1978 | Germany . |
| 156259 | 9/1956 | Sweden . |

OTHER PUBLICATIONS

Catalog of Aldrich Chemical Company, Inc p. 1849 Aldrich Chemical Company 1992.
Hawley's Condensed Chemical Dictionary, twelfth edition, Revised by R. J. Lewis, p. 926, Van Nostrand Reinhold, 1993.

Primary Examiner—Jill Warden
Assistant Examiner—Alexander Markoff
Attorney, Agent, or Firm—Nikaido, Marmelstein, Murray & Oram LLP

[57] ABSTRACT

Slide for the microscopic evaluation of liquid specimens comprising a base plate, at least one evaluation chamber and a cover foil. The evaluation chambers have a specimen application zone and an evaluation area. A capillary gap is located between the evaluation zone and the cover foil. An improved slide compared to known devices was achieved by using a foil to cover the evaluation chambers and by spacers which ensure a defined thickness of the capillary gap.

20 Claims, 2 Drawing Sheets

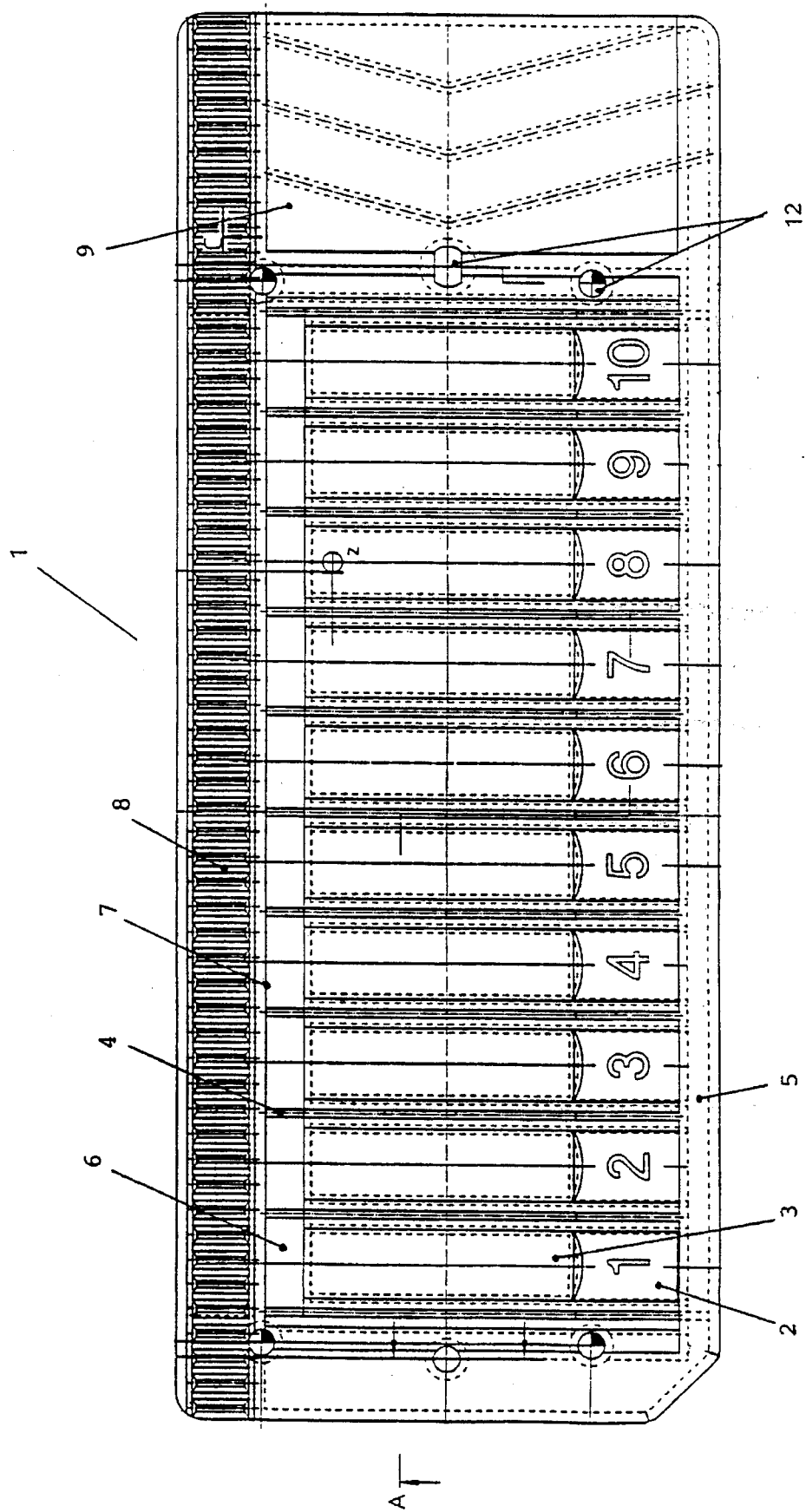

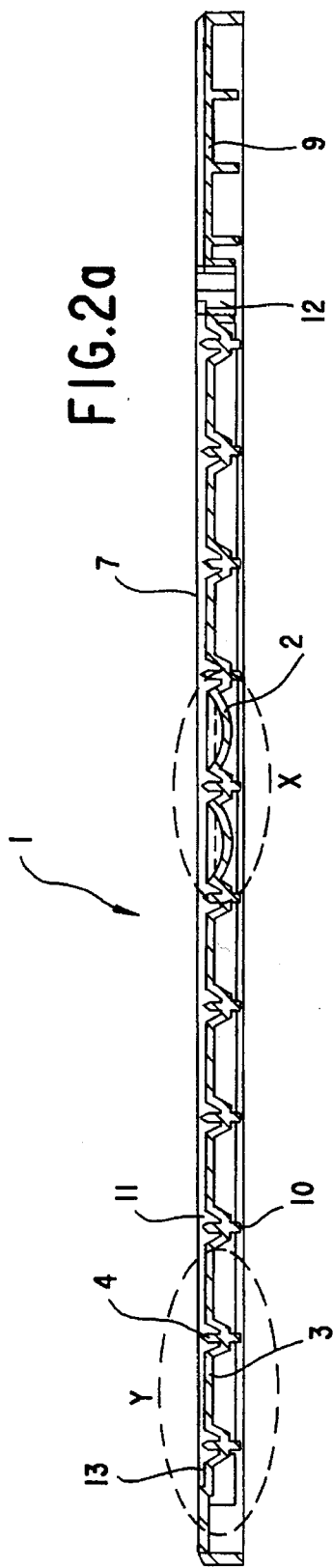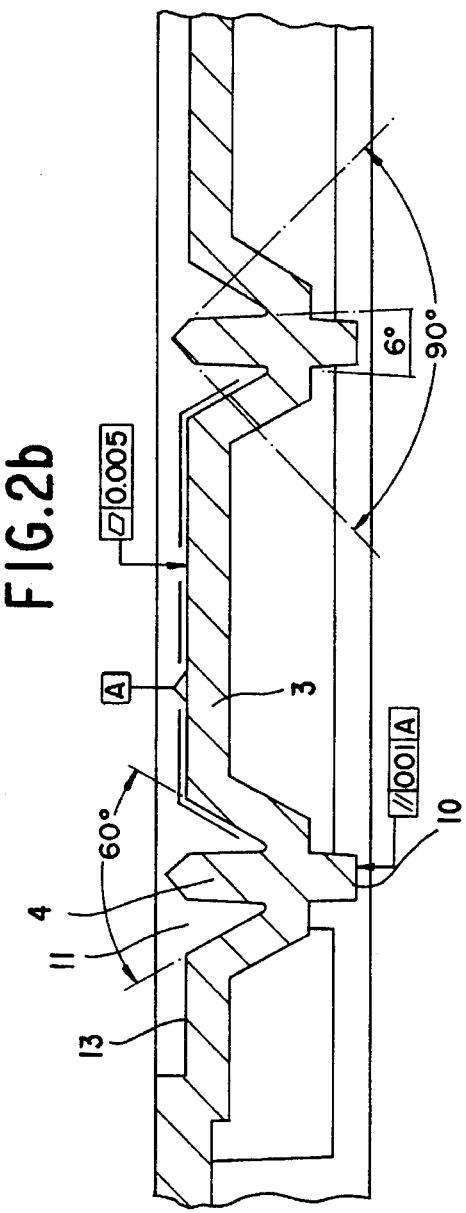

SLIDE FOR THE MICROSCOPIC EVALUATION OF LIQUID SPECIMENS

The invention concerns a slide for the microscopic evaluation of liquid specimens comprising a base plate with at least one evaluation chamber and at least two spacers wherein at least one of the evaluation chambers has an evaluation plane and one edge of this plane adjoins a specimen application zone which is inclined relative to the evaluation plane and at least two of the spacers are arranged at opposite edges of the area formed by the evaluation plane and specimen application zone, in addition a cover foil which is permanently joined to the spacers so that the cover foil is arranged parallel to the evaluation plane of at least one of the evaluation chambers and a capillary gap is formed between the cover foil and evaluation plane.

Slides according to the invention can be used for the automatic microscopic evaluation of specimen liquids. Such specimen liquids are for example urine, blood, saliva, tissue fluid and synovial fluid. The said specimens are evaluated in order to determine the number of cells present in the specimen and/or to determine which cell types are present on the basis of the cell morphology. A manual as well as a mechanical evaluation of slides is possible. The advantages of the invention are, however, particularly pronounced when the evaluation is carried out mechanically.

Slides for the microscopic evaluation of liquid samples are known from the state of the art which are composed of an upper and lower part. EP-A 0 210 071 for example describes such a slide in which the evaluation chambers are formed by joining two injection moulded parts. Spacers are located between the upper and lower part which ensure a constant thickness of a capillary gap. The upper and lower part are manufactured by injection moulding. A thickness of the capillary gap of 10 µm has turned out to be advantageous since this corresponds approximately to a single plane of focus of a microscope. No statement is made about the thickness of the cover plate of the evaluation chamber. In order to allow air which has been entrapped by the sample liquid to escape, two holes are proposed which are located on a semicircle which defines the sample space.

The document U.S. Pat. No. 4,299,441 is also known from the state of the art which also describes slides which are manufactured from injection moulded parts. The thickness of the walls of the evaluation chambers are stated to be 0.013±0.002 inch (i.e. 0.325±0.05 mm). As in the state of the art mentioned first, the basal surface of the sample chamber is essentially semicircular.

The slides described in the state of the art have the disadvantage that an injection moulded part is used as a cover plate. As a rule it is not possible to manufacture injection moulded parts of small thicknesses and without optical inhomogeneities. A further disadvantage of known slides is that the thicknesses of the capillary gaps are so small that the capillary flow can be obstructed by accumulations of cells. In addition the evaluation area of known slides is so small that cell counts have a large statistical error.

The object of the invention was to provide a slide which simplifies the microscopic evaluation of specimen liquids, makes it more precise and enables counting of particles. It was also an object of the invention to simplify the manufacture of precision slides.

Slides of the present invention have a base plate and a foil which is permanently joined to the base plate via spacers.

The base plate of the slide usually has the shape of a rectangular plate of a few millimeters thickness. The base plate can be manufactured advantageously as a plastic injection moulded part. One of several evaluation chambers are integrated into the base plate. At least the region of the base plate which includes the evaluation chambers is transparent. Hence materials which are suitable for the base unit are polycarbonates, polyacrylate, polyacrylmethacrylate, cellulose propionate and further plastics which can be used in injection moulding process and can be moulded under suitable conditions into light-transmissive injection moulded parts.

The examination chambers have an evaluation plane which is parallel to the plane of the base plate. A specimen application zone which is inclined relative to the evaluation plane adjoins the evaluation plane. For microscopic evaluation it is necessary that the evaluation plane is flat and has no unevennesses. The evaluation plane preferably has a width of several millimeters and a length of over 1 cm. A width between 4 and 6 mm and a length of 1 to 3 cm is preferred.

A specimen application zone which is inclined relative to the evaluation plane adjoins the evaluation plane. The specimen application zone can be planar, but the specimen application zone is preferably curved. It has proven to be advantageous when the curvature is selected such that the edge which is formed where the evaluation plane and specimen application zone meet is curved.

Spacers also belong to the evaluation chamber which are arranged at opposite edges of the surface formed by the evaluation plane and specimen application zone. If several evaluation chambers are present on the base plate then these are separated from one another by spacers so that sample liquid for one evaluation chamber cannot enter a neighbouring compartment. A depression is formed above the specimen application zone by the spacers and parts of the base plate which surround the evaluation chambers which serves as a specimen application space.

The spacers are bars which are arranged on the upper side of the base unit. Their upper edge i.e. the edge which faces away from the base unit is preferably tapered. This tapering of the upper edge of the spacers is important since it enables spacers and cover foil to be welded together without the cover foil being melted. In a preferred embodiment of the spacers these have a thickness of several tenths of a millimeter in the region joined to the base plate. This region is adjoined by a roof-like part, the top of which has a radius of curvature of several hundredths of a millimeter.

It is also advantageous when the spacers are accessible from the lower side of the base plate. In this embodiment the spacers are extended with essentially constant thickness on the underside of the base plate. This enables ultrasound to be coupled to the spacers via sonotrodes. The ultrasonic energy is transmitted by the spacers and is concentrated at their tips where the spacers and foil are welded. Since they function in this way the spacers are also denoted energy directors.

The function of the slide is also improved by a depression located between the evaluation plane and spacer. This depression, which is also denoted groove, serves to evacuate air from the capillary gap formed by the base unit and cover foil when liquid enters the capillary gap. The depression preferably has a "V" cross-section. Its maximum width and depth are preferably about 1 mm.

A reservoir which serves to hold excess liquid, can adjoin the edge of the evaluation plane that faces away from the specimen application zone. The reservoirs of neighbouring evaluation chambers are preferably separated from one another by spacers.

Guiding elements for moving the slide by an automatic device may also be located on the base plate. For example a roughened zone can be present outside the area of the evaluation chambers which can be used to move the slide by a friction wheel. In addition it is also possible that a gear rack is located on the slide which is engaged by a gear wheel of an analytical instrument. When the base plate is manufactured by injection moulding processes the said transport devices (roughened zone, gear rack) can be incorporated directly in the manufacturing process so that a one-piece embodiment of the base plate results.

Holes may in addition be located in the base plate which serve to position and/or hold the cover foil. These holes are also located outside the area of the evaluation chambers.

In order to attach the cover foil to the base unit, this is placed over the bars and is held by machine elements which engage in the holes of the base plate.

Transparent plastic foils are used as the cover foil for the slide. The material of the cover foil and the material of the base plate are preferably identical. In this manner it is possible to achieve a particularly durable welding of cover foil and base unit since the materials have the same softening temperatures and the same thermal coefficients of expansion. In principle the materials suitable as a foil material are the same as those for the base unit. In particular the product sold by the Röhm company under the name "Plexiglasfolie 530 K" is well suited as the cover foil.

A central feature of the invention is that a foil is used to cover the sample compartments instead of the injection moulded parts known from the state of the art. Foils can, on the one hand, be manufactured with a very thin and constant thickness. Foil materials below 0.2 mm thickness, in particular of 0.15 mm thickness, have the advantage that conventional microscope lenses are corrected to this thickness. Generally an improvement of the optical evaluation is achieved when the thickness of the cover foil is reduced. Since, however, a certain mechanical stability is necessary, the thickness of the cover foil cannot be reduced at will. A further advantage of foils over injection moulded parts is that optical inhomogeneities can be more easily avoided during their manufacture.

A cover foil for the slides according to the invention extends across the evaluation chambers present on the slide. The cover foil preferably protrudes on the side facing the specimen application zone beyond the line at which the evaluation plane and specimen application zone coincide. The side of the cover foil which faces the reservoir for holding excess liquid protrudes beyond the end of the evaluation plane but does not seal the reservoir so that air displaced by liquid can escape.

When the cover foil is mounted on the slide a capillary gap is formed between the evaluation plane and cover foil. This capillary gap is open towards the specimen application zone as well as towards the reservoir. According to the invention it has turned out that capillary gaps of 30 to 120 µm, preferably 60 to 90 µm, are especially suitable for the optical evaluation of urine. If thicknesses below 30 µm are chosen, accumulations of cells from when the liquid to be examined flows into the capillary gap which prevent the cell material from being uniformly distributed over the entire capillary gap.

A microscopic focal plane covers about 10 µm. Slides which cover several times the thickness of the focal plane are therefore preferably analysed by a microscope with automatic focussing since manual evaluation is very tedious. A relatively large evaluation plane is provided by the length preferred according to the invention of the capillary gap of over 1 cm which enables a higher accuracy of cell counting to be achieved than in the case of smaller evaluation planes. This evaluation area which is larger than the state of the art is made possible since liquid transfer is not obstructed for example by cell accumulations due to the layer thickness of the capillary gap which is also larger.

The side of the cover foil used for the slide that faces the capillary gap can also be provided with a dye which dissolves in the specimen liquid and serves to stain the cells present in the specimen liquid.

According to the invention it is also possible to use chemical reagents which react with the cell material in the specimen liquid or lead to a staining.

The invention in addition encompasses a process for manufacturing a slide composed of a base unit with at least one evaluation chamber and at least two spacers and a cover foil which is characterized in that the cover foil is pressed onto at least two spacers and the base unit and cover foil are ultrasonically welded together.

Base units and cover foils which have already been described are used for the manufacturing process. The cover foil is either pressed mechanically on the spacers or placed on them. The holes in the base unit which have already been mentioned can be used advantageously to position and also to hold the cover foil on the base unit. The welding of base unit and cover foil is carried out using ultrasound. The ultrasound can be preferably coupled to the spacers on the lower side of the base unit. The welding process is regulated so that only the tips of the spacers are melted but the cover foil is only melted at the contact surface without destruction of the cover foil.

The machine components which press the cover foil and base unit together during the welding process enable an exact control of the distance between base unit and cover foil. Since the tops of the spacers are tapered the welding process can be regulated in such a way that an exactly defined thickness of the capillary gap results.

The finished slide can be used for the microscopic evaluation of a liquid specimen. A drop of the liquid to be examined is applied to the specimen application zone. If the part of the specimen application zone which is located under the cover foil is wetted with liquid, the liquid is pulled into the capillary gap between the cover foil and evaluation plane by capillary forces. In order to evaluate the specimen, the capillary gap is illuminated from the underside of the slide and an image is formed of the contents of the capillary gap from the upper side of the slide using a microscope.

The advantage of the slides according to the invention is that, according to the above description, they are relatively simple to manufacture and lead to a device which enables cell counting as well as determination of cell morphology. The slides can be evaluated with conventional lenses due to the small thickness of the cover foil.

The description of the invention is specified in more detail by the following example.

BRIEF DESCRIPTION OF THE FIGURES

FIG. 1: Top-view of a slide

FIG. 2a: Cross-section through a slide

FIG. 2b: Enlargement of a section of FIG. 2a

DETAILED DESCRIPTION THE INVENTION

FIG. 1 shows a top-view of a slide (1) according to the invention with 10 evaluation chambers. Each of the evaluation chambers has a specimen application zone (2) and an evaluation plane (3). Individual evaluation chambers are separated from one another by spacers (4). The specimen application zones (2) are curved whereas the evaluation planes (3) are planar. FIG. 1 shows a one-piece embodiment of the lower part of a slide i.e. the border (5) and the area of the evaluation chambers were manufactured from one piece. The level of the evaluation plane (3) is displaced with respect to the plane of the border (5) whereas the upper edges of the spacers (4) are essentially on the same level as the border (5).

FIG. 1 also shows a reservoir (6) for each evaluation chamber for holding excess specimen liquid. It can be seen in the drawing that the cover foil (7) (continuous line) protrudes beyond the evaluation plane (3) (shown as a dashed line) on the side facing the reservoir and on the side facing the specimen application zone. The holes (12) serve to hold the cover foil (7) during ultrasonic welding with the base unit.

The gear rack (8) is also an integral component of the slide (1) which is mounted in one side panel of the border. The border also has a zone which serves as a holder (9) for a user.

FIG. 2a shows the sample carrier shown in FIG. 1 along the line of intersection A. The zone labelled X shows a cross-section at the level of the specimen application zones (2). Zone Y represents a cross-section at the level of the evaluation planes (3). FIG. 2 shows in which direction the specimen application zones (2) are curved. The shape of the spacers (4) is also shown. The spacers have coupling surfaces (10) for sonotrodes on the underside of the base unit. The spacers (4) are tapered on the side facing the cover foil (7). A groove (11) for evacuating displaced air from the capillary gap is located between spacer (4) and evaluation plane (3).

FIG. 2b is an enlargement of a section of the area Y in FIG. 2a. The roof-like shape of the spacer (4) can be seen in particular in this Figure.

FIGS. 2a and 2b also show that a zone is located on the external side of both chamber 1 and chamber 10 (numbering is given in FIG. 1) which has an evaluation plane (13) that is reduced in size and only has a groove on the side facing the evaluation chambers. Surprisingly it turned out that attachment of these reduced evaluation planes (13) in which no measurement is carried out leads to an improvement of the complete evaluation chambers. The reduced evaluation planes which are also covered by the cover foil ensure that variations in the thickness of the capillary gaps of the adjacent chambers (in the case shown chambers 1 and 10) are reduced. The reduced evaluation plane preferably has a width which is 30 to 70% of that of the evaluation plane (3). It is also preferable that the reduced evaluation plane only have a groove (11) on the side facing the complete evaluation planes.

List of Reference Symbols (1) slide
(2) specimen application zone
(3) evaluation plane
(4) spacer
(5) border
(6) reservoir
(7) cover foil
(8) gear rack
(9) holder
(10) coupling surface
(11) groove
(12) hole
(13) smaller evaluation plane

We claim:

1. A liquid specimen microscopic evaluation slide comprising
a base plate having at least one evaluation chamber and at least two spacers;
said evaluation chamber having an evaluation plane with edges, one edge of the evaluation plane adjoining a specimen application zone which is inclined relative to the evaluation plane;
the evaluation plane and the specimen application zone forming an area, with spacers located on two opposite sides of the area; and a cover foil mounted to the spacers in parallel to the evaluation plane to form a capillary gap therebetween wherein the spacers have first edges, spaced from the evaluation plane, to which the cover foil is mounted, and the first edges are tapered.

2. Slide of claim 1, wherein the spacers have second edges remote from said first edges and extending from the evaluation plane in a direction away from the cover foil, the second edges having coupling surfaces for coupling an ultrasound generator to the spacers, the base plate having an underside, the coupling surfaces being accessible from the underside of the base plate.

3. Slide of claim 2, wherein the spacers are an integral part of the base plate and are ultrasonically welded to the cover foil.

4. Slide of claim 1, wherein holes are located in the base plate outside of said at least one evaluation chamber receiving inserted tools therethrough to hold the cover foil on the base plate during the mounting of the base plate and the cover foil.

5. Slide of claim 1, wherein a V-shaped groove is located in the base plate between the evaluation chamber and the spacers.

6. Slide of claim 1, wherein adjacent evaluation chambers are separated by V-shaped-grooves, and the spacers are located in the grooves.

7. Slide of claim 1, wherein the specimen application zone is curved and defines with the evaluation plane a line of intersection which is located below the cover foil.

8. Slide of claim 1, wherein the capillary gap has an end that faces away from the specimen application zone, and the capillary gap at said end is open.

9. Slide of claim 1, wherein a reservoir adjoins the opening of the capillary gap.

10. Slide of claim 1, wherein the capillary gap has a thickness of 30 to 120 μm.

11. Slide of claim 10, wherein the thickness is 60 to 90 μm.

12. Slide of claim 1, wherein the cover foil has a thickness of less than 0.2 mm.

13. Slide of claim 1, wherein the capillary gap has a length of greater than 1 cm.

14. Slide of claim 1, wherein the base plate includes a gear rack for engagement with a means for moving the slide within an evaluation device.

15. Slide of claim 1, wherein the side of the cover foil which faces the capillary gap is provided with a dye which at least partially dissolves in liquid specimens.

16. Slide of claim 1, further including a reduced size evaluation plane located adjacent the two spacers which are spaced the greatest distance apart on the base plate, reduced size evaluation plane not being used for measurements.

17. Slide of claim 16, wherein the reduced size evaluation plane is 30 to 70% of the width of an evaluation plane.

18. Slide of claim 16, wherein the reduced size evaluation plane has a groove on only one side thereof.

19. A method of microscopically evaluating a liquid specimen comprising:

providing a liquid specimen microscopic evaluation slide as claimed in claim 1;

applying a liquid specimen to the specimen application zone of the slide;

illuminating the capillary gap from an underside of the slide; and evaluating the liquid specimen by use of a microscope located above the slide.

20. A method of manufacturing a liquid specimen microscopic evaluation slide comprising:

a) providing a base plate having at least one evaluation chamber, having an evaluation plane with edges; and at least two spacers spaced from the evaluation plane;

wherein one edge of the evaluation plane adjoins a specimen application zone which is inclined relative to the evaluation plane; the evaluation plane and the specimen application zone form an area; and wherein said spacers have tapered edges and are located on two opposite sides of the area;

b) providing a cover foil; and c) pressing the cover foil on the tapered edges of the at least two spacers while ultrasonically welding together the cover foil and the spacers to mount the cover foil to the spacers in parallel to the evaluation plane to form a capillary gap therebetween.

* * * * *